Figure 1:
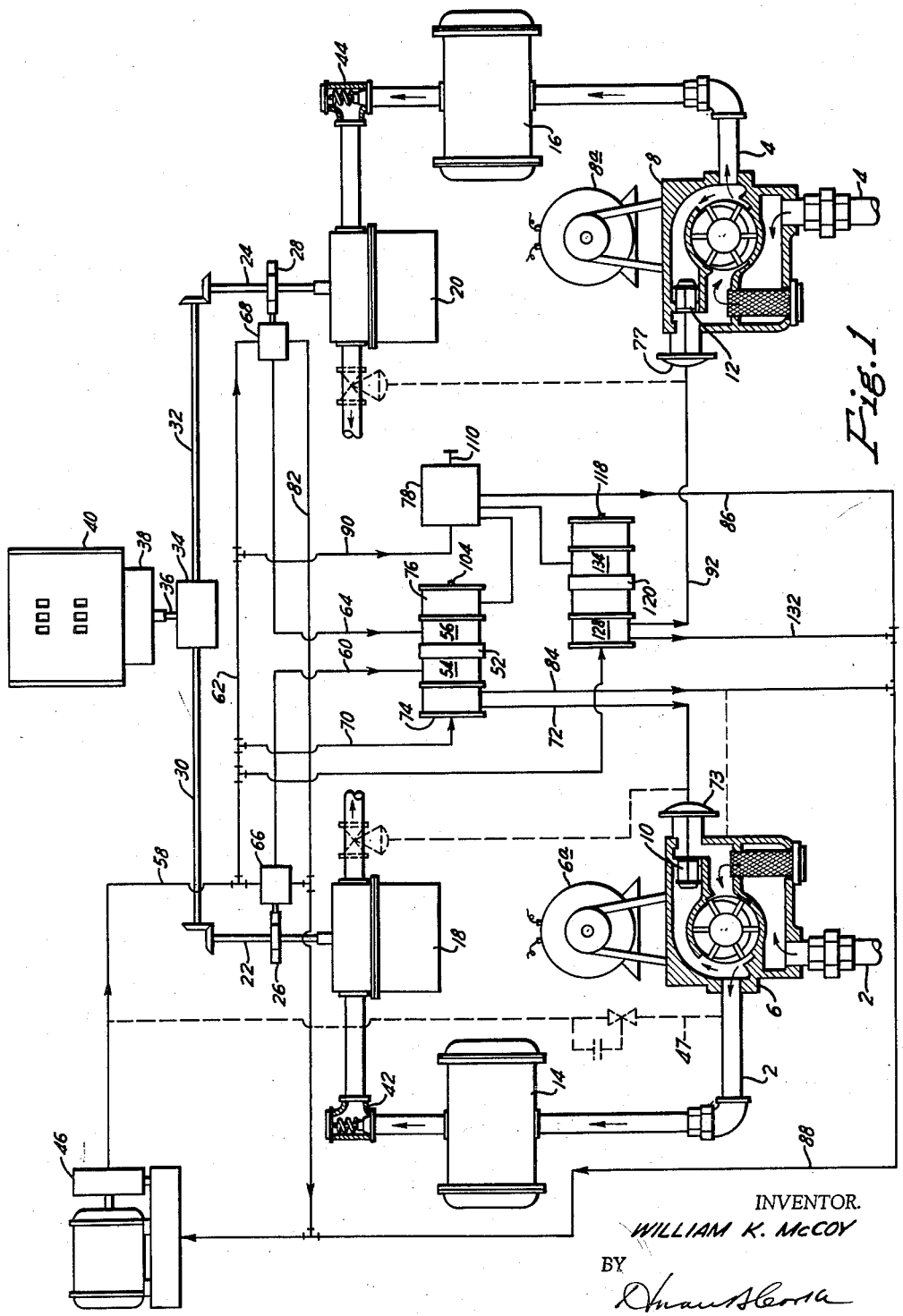

United States Patent Office 2,982,444
Patented May 2, 1961

2,982,444

FLUID PROPORTIONING APPARATUS

William K. McCoy, Toledo, Ohio, assignor to Gulf Oil Corporation, Pittsburgh, Pa., a corporation of Pennsylvania Filed Dec. 23, 1957, Ser. No. 704,476

8 Claims. (Cl. 222—26)

This invention relates to apparatus useful for dispensing different fluids in selected proportions with respect to one another. More particularly, the invention relates to improved proportioning means especially adapted to dispense different gasoline stocks in varying proportions.

Various structures have been proposed for the purpose of dispensing different fluids in a variety of proportions. However, many of these proportioning systems have been less than fully satisfactory in one or more respects. For example, difficulty has been encountered in obtaining accurate proportioning due to variations in the relative pressure differentials across the different portions of the systems. The problem is accentuated by the fact that the volume of flow through an orifice varies directly in proportion to the square of the pressure differential across that orifice. While it is a relatively easy matter to calibrate and adjust a given system to deliver the desired fluid proportions for any given pressure differential conditions, the proportions of the component fluids tend to vary whenever the pressure differentials in the respective supply lines change relative to one another. In many fluid dispensing systems, for example, conventional gasoline systems, the pressure differential between the dispensing nozzle and the fluid source normally will vary quite widely. Factors that can affect the pressure differential across such systems include changes in the delivery rate at the discharge valve and variations in the liquid levels in the supply tanks.

It has been proposed to compensate for pressure differential changes in the respective supply lines of fluid blending systems by means of pressure responsive control means adapted to vary the volume of flow through a given system in response to variations in the pressure differential therein. However, such attempts have not been fully satisfactory, particularly at very low flow rates where the ratio of one component is low with respect to the other. This is because the variations in the pressure differential on the low flow side of the system are too small to effect a proper correction. In this connection, it will be appreciated that the fluid pressure in a given conduit varies exponentially with the velocity of the flow therethrough. At low flow rates the conduit pressures are quite low and the pressure variations are therefore even smaller. The correction of flow rate at low rates of flow by means of variations in the fluid pressure in a conduit is especially difficult in view of the fact that the energy loss by the fluid in the conduit due to the low flow rate tends to accumulate as pressure differential at the site of the variable orifice by which flow is controlled. When this happens, more energy is required to adjust the variable orifice with accuracy. However, as the energy required to adjust the orifice increases, the energy available to control the variable orifice decreases in proportion to the square of the change in differential pressure.

Mechanical systems for correcting deviations in flow rates in proportioning systems due to variations in pressure differentials have also been proposed. Such systems are not entirely satisfactory where extreme accuracy is important, as the compensating linkages tend to absorb a portion of the corrective torque in the friction and mechanical clearances or "play" in the system. Moreover, the play in such systems and the inaccuracy resulting therefrom tend to increase as wear takes place in the elements thereof. In addition, mechanically adjustable proportioning systems ordinarily permit variation of proportions through a fixed series of mechanical increments, rather than through an infinite number of increments.

The present invention relates to a fluid proportioning system wherein variations in flow volume due to variations in pressure differential are corrected in response to the variations in the volume of flow as such, whereby highly accurate proportioning is obtained regardless of the ratio of the component fluids and regardless of the magnitude of the variations in the pressure differentials in the system, and whereby the proportions of the component liquids are infinitely variable with respect to one another. The proportioning system of this invention includes in combination first and second fluid conduits and first and second positive displacement pump means positioned respectively in the first and second fluid conduits and adapted to cause flow of fluid therethrough. First and second pressure responsive valve means adapted respectively to control the volume of fluid flowing through each of said conduits are also provided. First and second displacement meters are positioned in said fluid conduits to measure the volumes of fluid passed therethrough. It has been found that accurate proportioning can be obtained by the provision in combination with a system of the foregoing type of first and second rate sensing pilot valve means adapted to transmit a fluid pressure in proportion to the volume of fluid passed through the respective meters. A third pilot valve means is also provided which is adapted to transmit a fluid pressure to said first fluid pressure responsive valve means in proportion to the differential between the fluid pressure transmitted by said first and second pilot valve means. Ratio control regulating means are also provided for varying the fluid pressure transmitted by said third pilot valve means independently of the pressures transmitted by said first and second pilot valve means, and for concurrently varying inversely a fluid pressure transmitted to said second fluid pressure responsive valve means. The invention also includes subcombinations of the foregoing apparatus as well as other combinations including the foregoing apparatus.

Figure 2:
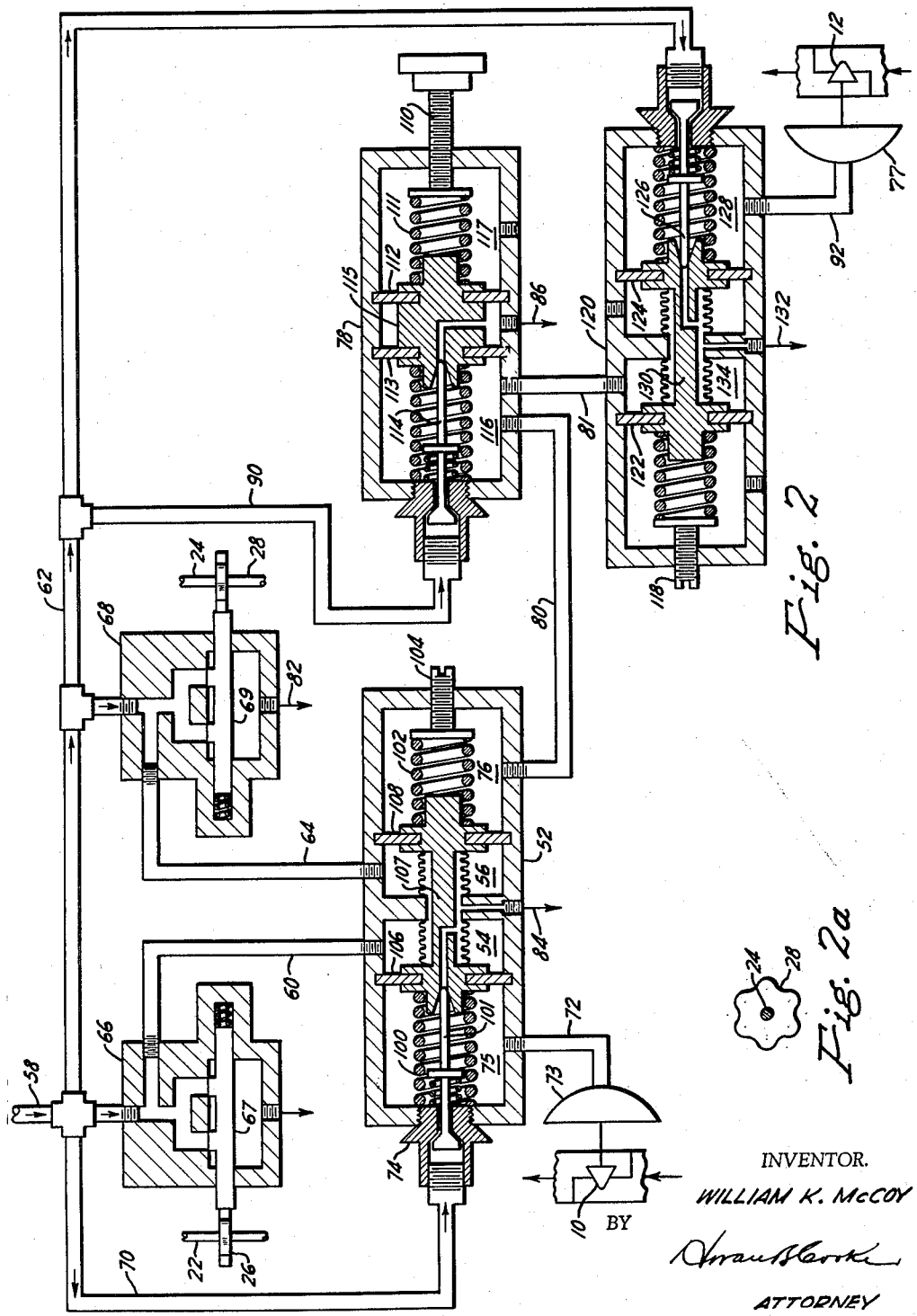
Figure 3:
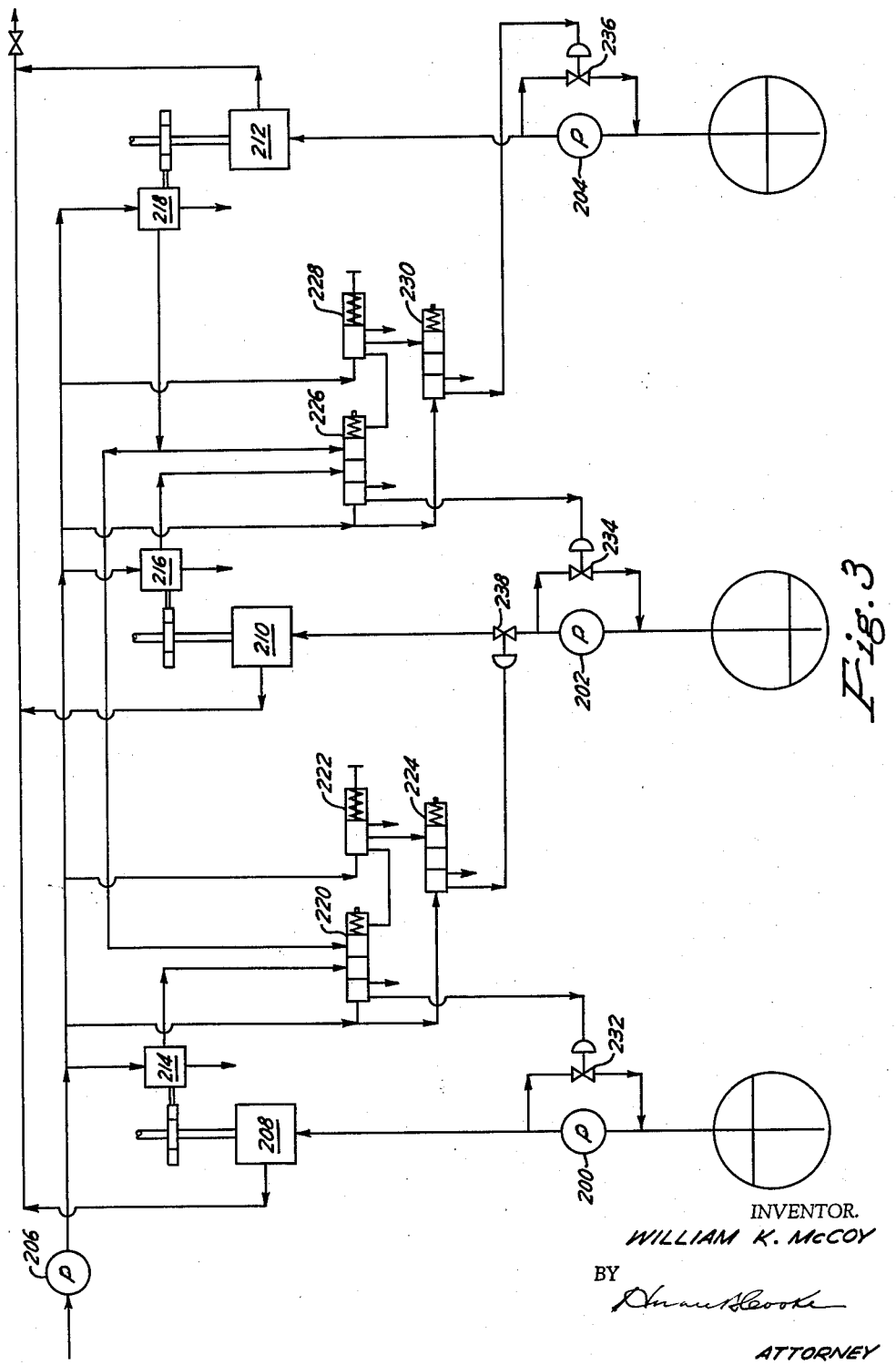

Referring now briefly to the several figures of drawing, Figure 1 is a schematic flow diagram showing a specific embodiment of the invention that is especially adapted for dispensing varying proportions of two different gasolines. Figure 2 is an enlarged view, partly in section, of the rate sensing pilot valve means, the ratio analyzer control, including pilot valve means, the ratio control regulator means, and the reversing relay of Figure 1. Figure 2a is a plan view of a multilobed cam (seen in front elevation in Figures 1 and 2) mounted coaxially on a rotatable shaft associated with one of the meters shown in Figure 1. Figure 3 is a flow diagram of a system according to the present invention that is adapted to dispense more than two fluids in varying proportions with respect to one another. In the various figures of the drawing like numerals refer to the same or similar elements of the structure.

Referring now to Figure 1 in greater detail numerals 2 and 4 refer to first and second fluid conduits having first and second positive displacement pump means 6 and 8 positioned respectively therein and adapted to cause flow of fluids therethrough. Numerals 10 and 12 denote first and second pressure responsive, direct acting valve means adapted to control the volume of fluid flow through each of conduits 2 and 4. Displacement meters 18 and 20, adapted to measure the volume of flow of fluids through conduits 2 and 4, are also shown positioned respectively in fluid conduits 2 and 4. Numerals 14 and 16 refer to air eliminators positioned in conduits 2 and 4. These elements are conventionally employed in gasoline dispensing systems and are adapted to separate air bubbles from liquid gasoline. Numerals 42 and 44 denote check valves adapted to prevent backflow of fluids in conduits 2 and 4. Rotatable meter shafts 22 and 24 are associated respectively with meters 18 and 20 in such a manner that the rotations of the shafts are directly proportional to the volumes of fluids passed through the meters. Conduits 58 and 60 and conduits 58, 62 and 64 constitute respectively first and second auxiliary fluid conduits adapted to supply fluid under pressure, from a source, 46, respectively to first and second pressure chambers 54 and 56 of ratio analyzer control means 52. In the system illustrated, the auxiliary fluid is a hydraulic fluid, such as oil, the system is closed, and element 46 is a hydraulic pump. Numerals 66 and 68 refer to first and second rate sensing pilot valve means positioned respectively in the aforesaid auxiliary fluid conduits. Rate sensing pilot valves 66 and 68 are adapted to transmit hydraulic fluid pressure to chambers 54 and 56 in proportion to the rotations of meter shafts 22 and 24 through the action of multilobed cams 26 and 28, respectively mounted coaxially thereon, upon the slidable valve members of pilot valves 66 and 68. Conduits 70 and 72 constitute a third auxiliary conduit adapted to supply hydraulic fluid under pressure to fluid pressure responsive diaphragm motor control means 73 of valve means 10. Numeral 74 refers to a third pilot valve means positioned in the third auxiliary conduit, said pilot valve means being adapted to control the hydraulic fluid pressure supplied to diaphragm motor 73. Pilot valve 74 is associated with pressure chambers 54 and 56 of ratio analyzer control 52 in such a manner as to transmit hydraulic fluid pressure to diaphragm motor 73 in proportion to the pressure differential between pressure chambers 54 and 56. Numeral 78 designates ratio control regulator means for directly varying the hydraulic fluid pressure transmitted by said third pilot valve means 74 independently of the pressure transmitted by pilot valves 66 and 68, and for concurrently varying inversely, through the action of reversing relay 120, the hydraulic fluid pressure transmitted to diaphragm motor 77 of valve 12. Numerals 84, 86, 88 and 132 refer to hydraulic fluid return conduits.

The dashed lines (not numbered) associated with conduits 92 and 72, and the diaphragm motor controlled valves connected to such dashed lines, indicate an alternative flow control structure. When this structure is employed, valves 10 and 12 will comprise spring loaded bypass valves as is conventional. The dashed line 47 connecting conduit 2 with conduit 58 and the dashed line (not numbered) connecting conduit 84 with pump 6 also indicate an alternative structure wherein the fluid being pumped and the power of pump 6 are used to supply the fluid pressure to the auxiliary system. In the case of the latter alternative structure, hydraulic fluid pump 46, the portion of line 88 between pump 46 and line 82, and the portion of line 48 between pump 46 and dashed line 47 in Figure 1 obviously will be unnecessary and can be dispensed with.

In Figure 2 numerals 67 and 69 refer respectively to slidable valve members of pilot valves 66 and 68. Although the structure shown in Figure 2 for pilot valves 66 and 68 is entirely suitable, other devices adapted to transmit fluid pressure in inverse proportion, or in direct proportion, with suitable modifications, to a varying external impulse can be used. For example, there can be used the differential rate sensing unit marketed by Builders-Providence, Inc. Numerals 100 and 102 refer to counterbalancing resilient spring members within the housing of ratio analyzer control 52. Numerals 75 and 76 designate counterbalancing pressure chambers acting in opposition to counterbalancing pressure chambers 54 and 56, respectively. Numerals 106 and 108 refer to flexible diaphragm members mounted at opposite ends of diaphragm connecting shaft 107. Numeral 104 denotes an adjusting screw for adjusting the spring load on diaphragm 108. Numeral 110 designates an adjustable screw member in ratio control regulator 78 and adapted to adjust the spring load on flexible diaphragm 112 which is mounted at one end of rigid diaphragm connecting member 115 opposite a similar flexible diaphragm member 113 mounted at the other end of connecting member 115. Numeral 116 refers to a pressure chamber in ratio control regulator 78. Numerals 101 and 114 refer respectively to the valve members of pilot valves mounted respectively in ratio analyzer control 52 and in ratio control regulator 78. Numeral 120 designates a fluid pressure reversing relay similar in structure and operation to element 52. Numeral 118 denotes the adjusting screw of the reversing relay. Flexible diaphragms, connected by longitudinally movable connecting member 130, are designated by numerals 122 and 124. Number 126 refers to a movable pilot valve member, the movement of which is adapted to develop a fluid pressure that is inversely proportional to the pressure in chamber 116 of the ratio control regulator 78 and to the pressure in chamber 134 of the relay. The pressure developed in chamber 128 is transmitted through line 92 to diaphragm motor 77 of valve 12.

In the operation of the device shown in Figures 1 and 2, screw 104 of ratio analyzer control 52 is adjusted so that flexible diaphragm members 106 and 108 are deformed to the right when no pressure is applied in pressure chamber 76. Under these circumstances the broad end of valve member 101 will be depressed in its seat and no hydraulic fluid from line 70 can pass into pressure chamber 75. The adjusting screw 118 of the reversing relay is also adjusted to deform diaphragms 122 and 124 to the left by a corresponding amount. Under this condition the broad end of pilot valve member 126 will be raised from its seat, whereby hydraulic fluid can pass into chamber 128. Screw 110 of ratio control regulator 78 is now adjusted so that diaphragm members 112 and 113 are deformed to the left thereby raising the broad end of valve member 114 from its seat. Under this condition hydraulic fluid under pressure will be permitted to pass into pressure chamber 116 from whence this pressure is transmitted through conduits 80 and 81 to pressure chambers 76 and 134, respectively. When the pressure in pressure chamber 116 is sufficient to balance the pressure in chamber 117, including the load of spring 111, and the pressure in chamber 134 is sufficient to balance the spring pressure on the opposite side of the diaphragm, the broad end of valve 114 will again become seated preventing further passage of hydraulic fluid from supply line 90 into pressure chamber 116. The initial adjustment of screw 110 is therefore such that the fluid in chamber 116 and connected pressure chambers in the ratio analyzer control and in the reversing relay is sufficient to balance the system. Under these circumstances, that is with the pressures on diaphragms 106 and 108 and on diaphragms 122 and 124 being sufficient to balance, the apparatus of Figure 1 is adjusted to deliver equal volume proportions of fluid, in this instance gasoline, from supply conduits 2 and 4.

Thus, when power is supplied to electric pump motors 6a and 8a, positive displacement pumps 6 and 8 connected respectively to said pump motors by means of drive belts are caused to operate at a constant speed in such a manner as to cause gasoline flow through the pumps, through air eliminators 14 and 16, through check valves 42 and 44 and in the direction of displacement meters 18 and 20 respectively, and thence into extensions of conduits 2 and 4 respectively, from which extensions the respective gasolines are blended, preferably upstream of a discharge valve, not shown, and downstream of check valves, not shown, positioned in lines 2 and 4 adjacent the discharge valve.

As indicated above, the rotations of meter shafts 22 and 24 are directly proportional to the volumes of liquids passed through the respective meters. The rotations of meter shafts 22 and 24 are transmitted respectively through bevel gears (not numbered) to shafts 30 and 32 from which they are totalized in differential gear box 34. The total rotations of meter shafts 22 and 24 are transmitted through output shaft 36 through a variator 38, or change-speed gear mechanism, where the volume of liquid dispensed is multiplied by the price per unit volume of the blended gasoline that has been preset in the variator. Another output shaft (not shown) mounted concentrically with shaft 36, and rotating in direct proportion to the total sales price of the volume of delivered liquid, is driven by the gearing of variator 38. The rotations of volume shaft 36 and its concentric price shaft not shown are caused to register the total price of the volume of liquid delivered and the total volume of liquid delivered on the face of computer 40, which also acts as a cost register and volume register. The gearing of differential gear box 34, variator 38 and the structure of computer 40 can be conventional, and accordingly their structures as such do not comprise the essence of this invention. For example, computer 40 can be similar to the construction proposed in U.S. Patent No. 2,264,557 to E. A. Slye. The structure of variator 38 may be similar to that described in U.S. Patent No. 2,111,996 to E. A. Slye. Where the ratio of the component gasolines and the price per unit volume are changed frequently, variator-computer structure of the type disclosed in U.S. Patent No. 2,743,843 to Bliss can be used. In modifications of this type the rotations of shafts 22 and 24 will be transmitted to separate variators and the total price of each component liquid calculated therein will be totalized in a single shaft prior to transmittal to a computer. Alternatively, where it is desired to vary the price per unit volume of the various blended gasolines independently of the volume proportions of the components, variator-computer structure of the type disclosed in copending application Serial No. 646,389 filed March 15, 1957 in the names of McGaughey and Swank can be employed. In modifications of this type the auxiliary hydraulic fluid pressure can be used as a source of power to shift the variator.

The rotational motion of meter shafts 22 and 24 are translated into linear motion by the action of multilobed cams 26 and 28, mounted respectively on shafts 22 and 24, upon slidable valve members 67 and 69 mounted respectively in rate sensing pilot valves 66 and 68. As will be seen from an inspection of the structure of pilot valves 66 and 68 relatively rapid rotation of meter shafts 22 and 24 and multilobed cams 26 and 28 associated respectively therewith will cause slidable valve members 67 and 69 to be opened during a relatively large proportion of the time during which the meters 18 and 20 are operating, and vice versa. A change in the rate of opening of valve members 67 and 69 causes a change in the output pressures of pilot valves 66 and 68 that is proportional to any change in the rate of flow through the associated meter. These output pressures are transmitted respectively through lines 60 and 64 to counterbalancing pressure chambers 54 and 56 in ratio analyzer control 52, where they act upon diaphragms 106 and 108.

When meters 18 and 20 are both passing the same volumes of liquid, meter shafts 22 and 24 will rotate at exactly the same speed, and the output pressures from pilot valves 66 and 68 acting on the inner sides of diaphragms 106 and 108 in ratio analyzer control 52 will exactly balance one another and no change in the position of pilot valve member 101 occurs. However, should one of the meters begin to pass a different volume of gasoline relative to the other, the system will automatically be corrected to re-establish the proper proportions.

For example, if meter shaft 24 should rotate at a slower rate than meter shaft 22 due to the passage of a relatively smaller volume of gasoline through meter 20 than through meter 18, the output pressure from pilot valve 68 will become larger than the output pressure from pilot valve 66. Diaphragm 108 will be deformed to the right thus causing movement to the right of diaphragm connecting member 107. Movement to the right of diaphragm connecting member 107 causes the narrow end of valve member 101 to become unseated, thus permitting a reduction of the pressure in chamber 75 that is transmitted through line 72 to diaphragm motor 73 of valve 10. Reduction of the pressure or load acting on diaphragm motor 73 permits bypass valve 10 in pump 6 to open when a lower pressure is reached in conduit 2 downstream of pump 6, whereby more gasoline will be bypassed and less gasoline will be passed through meter 18. When the rate of rotation of meter shaft 22 has been reduced until it is equal to the rate of rotation of meter shaft 24, the output pressure from rate sensing pilot valve 66 transmitted to pressure chamber 54 will have increased until it is equal to the output pressure from rate sensing pilot valve 68. The increased pressure in chamber 54 will act on diaphragm 106 and diaphragm connecting member 107 associated therewith until the narrow end of valve member 101 again becomes seated.

Conversely, an increase in the volume of gasoline passed through meter 20 relative to that passed through meter 18 will result in a decrease in the output pressure of rate sensing pilot valve 68 relative to the output pressure of rate sensing pilot valve 66 and in a decrease in the pressure in chamber 56 relative to that in chamber 54. When the pressure in chambers 54 exceeds that in chambers 56, diaphragm 106 will be deformed to the left thus permitting oil under pressure from the hydraulic fluid line 70 to pass into chamber 75 until the pressure in chamber 75 is sufficient to balance the difference in pressure between chambers 54 and 56. The increase in pressure in chamber 75 acts on bypass valve 10 as described to permit a corresponding increase in the pressure downstream of pump 6 in conduit 2. The increase in pressure in conduit 2 results in an increase in the volume of gasoline passed through meter 18. The increased volume of gasoline passed through meter 18 in turn results in a lower output pressure from pilot valve 66 and a corresponding reduction in pressure in pressure chamber 54.

Thus, a change in the volume of flow through meter 20 results in a proportionate change in the pressure in pressure chamber 56, a corresponding change in the pressure in chamber 75 and hence a change in flow through meter 18, which after having taken effect will be reflected in a change in pressure in chamber 54.

On the other hand a reduction in the speed of rotation of meter shaft 22, due to a reduction in the volume of gasoline flowing through meter 18, will result in an increased output pressure from pilot valve 66, an increased pressure in pressure chamber 54, an increase in pressure in chamber 75 and a corresponding increase in the load on bypass valve 10. As explained above increasing the load on bypass valve 10 results in an increased volume of flow through meter 18. The increased volume of flow through meter 18 will then be reflected in a corresponding reduction in the output pressure of pilot valve 66 acting on pressure chamber 54.

Conversely, an increase in the speed of rotation of meter shaft 22 due to an increase in the volume of gasoline passed through meter 18 will cause a corresponding decrease in the output pressure from pilot valve 66 and a decrease in the pressure in pressure chamber 54. A decrease in pressure in chamber 54 permits deformation of diaphragm 106 to the right and a reduction in pressure in chamber 75 and a consequent reduction in the load on bypass valve 10. Reducing the load of bypass valve 10 reduces the pressure in conduit 2 downstream of pump 6 thus reducing the volume of gasoline passed through meter 18. The decrease in volume of flow through meter 18 is reflected in less rapid rotation of meter shaft 22 and increased output pressure from pilot valve 66 and in chamber 54.

The foregoing description has been directed toward the delivery of gasoline from conduits 2 and 4 in equal proportions. To deliver gasoline from conduits 2 and 4 in other than equal proportions all that is necessary is to adjust screw 110 of ratio control regulator 78 to increase or decrease the load on the right side of diaphragm 112. An increase in the load on diaphragm 112 causes an increase in pressure in chamber 116, and a corresponding change in pressure in chamber 76 of ratio analyzer control 52 and chamber 128 of reversing relay 120. The increase in pressure in chamber 76 causes diaphragm 108 to be deformed to the left thus increasing the pressure in chamber 75 and in turn increasing the load on bypass valve 10. An increase in the load on bypass valve 10 will permit a larger volume of liquid to be passed through meter 18 than through meter 20. The relatively larger flow through meter 18 will result in a lower output pressure from pilot valve 66 and a correspondingly lower pressure in chamber 54. The system will reach equilibrium when the pressure in chamber 76 plus the pressure in chamber 54 equal the pressure in chamber 56. Thus the system will be balanced even though the volume of liquid passed through meter 18 is larger than that passed through meter 20. The increase in pressure in chamber 130 tends to deform diaphragms 122 and 124 of reversing relay 120 to the right, thus causing a reduction in the pressure in chamber 128 and a reduction in the load on bypass valve 12. Thus, adjustment of the ratio control regulator knob produces a direct change in the load on valve 10 and an inverse change in the load on valve 12. When it is desired that the volume of gasoline passed through meter 18 be less than that passed through meter 20, screw 110 of ratio control regulator 78 is merely adjusted to reduce the load on diaphragm 112, and the load on valve 10 is reduced and the load on valve 12 is increased. Any deviation from preset volume ratios other than 1:1 will be corrected for in the manner described above in connection with the adjustment of element 110 adapted to deliver equal proportions by volume of gasoline through conduits 2 and 4. The extreme adjustments of member 110 will correspond respectively to no load on valve 10 or no load on valve 12, and therefore to no gasoline through the corresponding meter.

Although the apparatus of Figures 1 and 2 is designed for use in dispensing gasoline, certain conventional elements of gasoline dispensing units, such as hoses, discharge valve nozzle, visigage, and interlock system have not been shown in the interest of clarity. It will be understood that these and other conventional elements of structure can be incorporated into the structure shown in an obvious manner without affecting the fundamental prinpicles of this invention.

Referring now to Figure 3 of the drawing, numerals 200, 202 and 204 designate positive displacement pumps adapted to force liquid from separate tanks, not numbered, through separate conduits associated with the respective pumps, and through displacement meters 208, 210 and 212, respectively. Hydraulic rate sensing pilots adapted to produce output pressures inversely proportional to the volume of flow through the meters are designated by numerals 214, 216 and 218. These elements are similar in structure to elements 66 and 68 of Figures 1 and 7. Numerals 222 and 228 refer to ratio control regulators similar in structure to that shown for ratio control regulator 78 in Figure 2. Numerals 220 and 226 refer to ratio analyzer controls similar in structure to ratio analyzer control 52 in Figure 2. Numerals 224 and 230 denote reversing relays similar in structure to reversing relay 120 shown in Figure 2. Numerals 232, 234, 236 and 238 refer to diaphragm motor control valves. Numeral 206 refers to a pump for developing pressure in an auxiliary hydraulic fluid system. As was the case in connection with Figure 2, the return lines for the hydraulic system have not been shown in their entirety in the interest of simplicity.

In operation of the apparatus of Figure 3, the adjusting screws of ratio control analyzers 220 and 226 are adjusted so as to deform the diaphragms thereof to the right. The adjusting screws of reversing relays 224 and 230 are then adjusted to deform the diaphragms thereof to the left to corresponding degrees respectively. Now the adjusting screws of ratio control regulators 222 and 228 are adjusted so as to balance the load imparted by the adjusting screws to the diaphragms of ratio analyzer controls 220 and 226 and reversing relays 224 and 230. In the present instance the loads imparted by the adjusting screws to the diaphragms of ratio control regulator 226 and reversing relay 230, and the balancing load imparted by the adjusting screw of ratio control regulator 228 are first adjusted with respect to the loads imparted by the corresponding adjusting screws of ratio analyzer control 220, reversing relay 224 and ratio control regulator 222, so that the system will deliver liquid through meters 208, 210 and 212 respectively in a 1:1:1 ratio by volume. To adjust the system for liquid ratios other than 1:1:1, the regulating screws of ratio control regulators 222 and 228 are merely adjusted so as to vary the loading of valves 232 and 236 with the loading of valve 234. The extreme positions of the adjusting screw of ratio control regulator 228 will correspond either to a 0:1 or a 1:0 ratio by volume of the liquids passing through pumps 202 and 204. The extreme positions of the adjusting screw of ratio control regulator 222 will correspond either to a 0:1 or a 1:0 ratio by volume of the liquids passing through pumps 200 and 202.

Any deviation from the desired preset volume ratio by meter 212 will be reflected by an inverse change in the output pressure of rate sensing pilot 218, which in turn causes a corrective change in the loading of valves 232 and 234 through the unbalance created in ratio analyzer controls 220 and 226.

Any deviation from the preset volume ratio of the system with regard to the liquid passing through meter 210 will be reflected in an inversely corresponding change in the output pressure of rate sensing pilot 216. This change in output pressure unbalances the center chambers in ratio analyzer control 226 and causes a corresponding corrective change in the loading of valve 234.

Similarly, any deviation from the preset volume ratio by the liquid flowing through meter 208 will cause an inversely corresponding change in the output pressure of rate sensing pilot 214. The latter change will in turn correct the loading of valve 232. It will be understood that correction of the liquid volume passing through meter 208 or 210 with respect to the liquid volume passing through meter 212 will simultaneously correct the liquid volume passing through that meter with respect to the volume of liquid passed through the other meter.

As noted above, the extreme positions of the adjusting screws of either ratio control regulator will correspond to no liquid passing through one of the meters associated therewith. Under these circumstances all of the liquid pumped by the pump associated with this meter will be bypassed. In the case of volatile liquids such as gasoline, excessive bypassing of the liquid may be undesirable as heat sufficient to vaporize a portion of the liquid may be absorbed by continuous recirculation of the same liquid through the bypass system. Vaporization of liquid is undesirable as this may cause inaccurate proportioning by the meters, cavitation in the pumps, and other difficulties. Accordingly, where liquid vaporization is a problem it is preferred that adjustment of the ratio control regulator adjusting screw to its extreme position will open a switch shutting off the motor driving the pump through which liquid is being totally bypassed. The same modification is desirable in similar circumstances in the apparatus of Figures 1 and 2.

As discussed in connection with the apparatus of Figure 1, although the auxiliary hydraulic system need not be separate, a separate hydraulic fluid and pump has been employed in the apparatus of Figure 3 for the auxiliary system. Where the fluid being dispensed is flammable, as in the case of gasoline, it may be preferable to utilize the pumped flammable fluid as a source of hydraulic power to drive the pump of the auxiliary hydraulic system as a convenient means of providing explosion-proof operation. This modification can of course be resorted to in connection with the apparatus of Figures 1 and 2, as well as that of Figure 3.

It will be understood that in order conveniently to duplicate various volume ratios, the ratio control regulators of the apparatus of Figures 1, 2 and 3 preferably will be provided with a visual indication of the ratio which the system will deliver.

Although the herein described systems have been described as embodying hydraulic actuation, it will be understood that similar actuation can be effected by substituting a pneumatic system employing an air compressor and air actuated pilots, regulators, analyzers and relays.

Although the systems illustrated herein have been shown with the positive displacement pump means positioned intermediately in the supply conduits, it will be understood that similar pump means can be placed at the inlet ends of said conduits instead of in a conventional manner. Accordingly, the expression "pump means positioned in said fluid conduit" or the like as used herein is intended to cover either of such positions.

The systems shown in Figures 1, 2 and 3 are adjustable to dispense other than equal proportions by volume. Where only equal proportions by volume are desired, the ratio control regulators, the reversing relays and the conduits connected thereto can be dispensed with entirely. In such instances the diaphragm motor controlled valve means associated with the reversing relay can be a conventional spring loaded valve.

Also, where it is not necessary that one of the fluids, for example the fluid of conduit 4, be capable of being dispensed in zero volume, the reversing relay 120 associated with the valve 12 of the conduit through which that fluid is passed can be eliminated along with the conduits connected thereto. In this case, valve 12 will also be a conventional spring loaded bypass valve.

Obviously, resort to many modifications of the above-described invention may be had without departure from the spirit thereof, and accordingly only such limitations should be imposed as are contained in the claims appended hereto.

I claim:

1. Fluid proportioning means comprising in combination first and second fluid conduits and first and second positive displacement pump means positioned respectively in said first and second fluid conduits for causing flow of fluid therethrough, first and second fluid pressure responsive valve means respectively for controlling the volume of fluid flowing through each of said conduits, first and second displacement meters positioned respectively in said fluid conduits for measuring the volumes of fluid passed therethrough, first and second rate sensing pilot valve means for transmitting a fluid pressure in porportion to the volume of fluid passed through the respective meters, a third pilot valve means for transmitting a fluid pressure to the first only of said fluid pressure responsive valve means in proportion to the differential between the fluid pressure transmitted by said first and second pilot valve means, and ratio control regulating means for varying the fluid pressure transmitted by said third pilot valve means independently of the pressures transmitted by said first and second pilot valve means, and for concurrently varying inversely a fluid pressure transmitted to said second fluid pressure responsive valve means.

2. Fluid proportioning means comprising in combination first and second fluid conduits, first and second positive displacement pump means positioned respectively in the first and second fluid conduits for causing flow of fluid therethrough, fluid pressure responsive valve means for controlling the volume of fluid passing through one of said conduits, first and second displacement meters positioned in said fluid conduits for measuring the volumes of fluid passed therethrough, first and second rate sensing pilot valve means for transmitting a fluid pressure in proportion to the volume of fluid passed through the respective meters, a third pilot valve means for transmitting a fluid pressure solely to said fluid pressure responsive valve means in proportion to the differential between the pressure transmitted by said first and second pilot valve means, and ratio control regulating means for varying the fluid pressure transmitted by said third pilot valve means independently of the pressures transmitted by said first and second pilot valve means.

3. Gasoline proportioning means comprising in combination first and second fluid conduits and first and second positive displacement pump means positioned respectively in said first and second fluid conduits for causing flow of fluid therethrough, first and second fluid pressure responsive valve means respectively for controlling the volume of fluid flowing through each of said conduits, first and second displacement meters positioned respectively in said fluid conduits for measuring the volumes of fluid passed therethrough, each of said meters being provided with a rotatable shaft whose rotation is directly proportional to the volume of fluid passed therethrough, first and second rate sensing pilot valve means for transmitting a fluid pressure in proportion to the volume of fluid passed through the respective meters, a third pilot valve means for transmitting a fluid pressure to the first only of said fluid pressure responsive valve means in proportion to the differential between the fluid pressure transmitted by said first and second rate sensing pilot valve means, and ratio control regulating means for varying the fluid pressure transmitted by said third pilot valve means independently of the pressures transmitted by said first and second pilot valve means, for concurrently varying inversely a fluid pressure transmitted to said second fluid pressure responsive means, differential gearing associated with said rotatable meter shafts, said differential gearing being provided with an output shaft whose rotation corresponds to the total rotations of said rotatable meter shafts, a volume register associated with said output shaft for registering the volume of gasoline corresponding to the rotation of said output shaft, variator means driven by said output shaft, said variator means being provided with an output shaft whose rotation is proportional to the product of the volume of gasoline dispensed times the price per unit volume of said gasoline, and a cost register associated with the output shaft of said variator means for registering the total cost of the gasoline dispensed.

4. Fluid proportioning means comprising in combination first and second fluid conduits, first and second positive displacement pump means positioned respectively in said fluid conduits for causing flow of fluid therethrough, pressure responsive valve means for controlling the volume of fluid flowing through one of said conduits, first and second displacement meters, positioned respectively in said fluid conduits, each of said meters being provided with a rotatable shaft whose rotation is directly proportional to the volume of fluid passed therethrough, first and second auxiliary fluid conduits associated respectively with first and second counterbalanced pressure chambers, first and second rate sensing pilot valve means positioned respectively in said auxiliary fluid conduits for transmitting fluid under pressure to said first and second pressure chambers respectively in proportion to the rotations of said meter shafts, a third auxiliary fluid conduit associated with fluid pressure responsive means for actuating the pressure responsive valve means, and a third pivot valve means positioned in said third auxiliary fluid conduit for transmitting fluid under pressure solely to said fluid pressure responsive means in proportion to the pressure differential between said first and second pressure chambers.

5. Fluid proportioning means comprising in combination first and second fluid conduits, first and second positive displacement pump means positioned respectively in said fluid conduits for causing flow of fluid therethrough, pressure responsive valve means for controlling the volume of fluid flowing through one of said conduits, first and second displacement meters positioned respectively in said fluid conduits, each of said meters being provided with a rotatable shaft whose rotation is directly proportional to the volume of fluid passed therethrough, first and second auxiliary fluid conduits associated respectively with first and second counterbalanced pressure chambers, first and second rate sensing pilot valve means positioned respectively in said auxiliary fluid conduits for transmitting fluid under pressure to said first and second pressure chambers respectively in proportion to the rotations of said meter shafts, a third auxiliary fluid conduit associated with fluid pressure responsive means for actuating the pressure responsive valve means, a third pilot valve means positioned in said third auxiliary fluid conduit for transmitting fluid under pressure solely to said fluid pressure responsive means in proportion to the pressure differential between said first and second pressure chambers, ratio control regulating means for varying the fluid pressure transmitted by said third pilot valve means independently of the pressure transmitted by said first and second rate sensing pilot valve means.

6. Fluid proportioning means comprising in combination first and second fluid conduits, first and second positive displacement pump means positioned respectively in said fluid conduits for causing flow of fluid therethrough, first and second pressure responsive valve means for controlling the volume of fluid flowing through each of said conduits, first and second displacement meters positioned respectively in said fluid conduits, each of said meters being provided with a rotatable shaft whose rotation is directly proportional to the volume of fluid passed therethrough, first and second auxiliary fluid conduits associated respectively with first and second counterbalanced pressure chambers, first and second rate sensing pilot valve means positioned respectively in said auxiliary fluid conduits for transmitting auxiliary fluid under pressure to said first and second pressure chambers respectively in proportion to the rotations of said meter shafts, a third auxiliary fluid conduit associated with fluid pressure responsive means for actuating the first only of the pressure responsive valve means, a third pilot valve means positioned in said third auxiliary fluid conduit for transmitting auxiliary fluid under pressure to said fluid pressure responsive means in proportion to the pressure differential between said first and second pressure chambers, and ratio control regulating means for varying the fluid pressure transmitted by said third pilot valve means independently of the pressures transmitted by said first and second pilot valve means, and for concurrently varying inversely the fluid pressure transmitted to said second fluid pressure responsive valve means.

7. The apparatus of claim 6 where the auxiliary fluid is a liquid.

8. The apparatus of claim 6 where the auxiliary fluid is the same as that passed through one of said first and second fluid conduits.

References Cited in the file of this patent

UNITED STATES PATENTS

| 2,509,629 | De Giers et al. | May 30, 1950 |
| 2,743,843 | Bliss | May 1, 1956 |

FOREIGN PATENTS

| 460,161 | Great Britain | Jan. 22, 1937 |
| 639,264 | Germany | Dec. 2, 1936 |

UNITED STATES PATENT OFFICE
CERTIFICATE OF CORRECTION

Patent No. 2,982,444            May 2, 1961

William K. McCoy

It is hereby certified that error appears in the above numbered patent requiring correction and that the said Letters Patent should read as corrected below.

Column 11, line 7, for "pivot" read -- pilot --.

Signed and sealed this 26th day of September 1961.

(SEAL)
Attest:

ERNEST W. SWIDER
Attesting Officer

DAVID L. LADD
Commissioner of Patents
USCOMM-DC